United States Patent [19]

Kraus

[11] 4,216,637
[45] Aug. 12, 1980

[54] MOLDING RETAINER

[75] Inventor: Willibald Kraus, Kaiserslautern, Fed. Rep. of Germany

[73] Assignee: TRW Inc., Cleveland, Ohio

[21] Appl. No.: 937,654

[22] Filed: Aug. 28, 1978

[30] Foreign Application Priority Data

Sep. 5, 1977 [DE] Fed. Rep. of Germany ....... 2739889
Jan. 20, 1978 [DE] Fed. Rep. of Germany ... 7801639[U]

[51] Int. Cl.² ............................................. E04F 19/02
[52] U.S. Cl. ................................ 52/718; 24/73 PM
[58] Field of Search ................................ 52/716–718; 24/73 PM, 73 FJ

[56] References Cited

U.S. PATENT DOCUMENTS 3,222,838  12/1965  Sweeney .............................. 52/717
3,246,440   4/1966  Meyer ................................. 52/718

*Primary Examiner*—James L. Ridgill, Jr.
*Attorney, Agent, or Firm*—James R. O'Connor

[57] ABSTRACT

A molding retainer for fastening a molding to a support panel which has a head stud welded thereon. The retainer is of molded plastic construction, and has an open-ended channel extending through it from one end to the other whereby it can be slidably mounted on the stud from either of its ends. The channel defines a retention area intermediate the end of the retainer and two insertion areas leading from its ends to the retention area and the retainer carries a pair of resilient tongues which are urged against the head of the stud when the retainer is mounted on the stud and the stud head is disposed in the retention area. Each of the tongues has an abutment which engages the stud head to inhibit accidental removal of the retainer from the stud when the stud head is positioned in the retention area. The retainer carries external shoulders over which the molding can be slid or snapped once the retainer is secured to the stud. In a modified form of the retainer, the shoulder on one side of the clip is replaced by external hooks and a pressure element disposed between the hooks.

42 Claims, 14 Drawing Figures

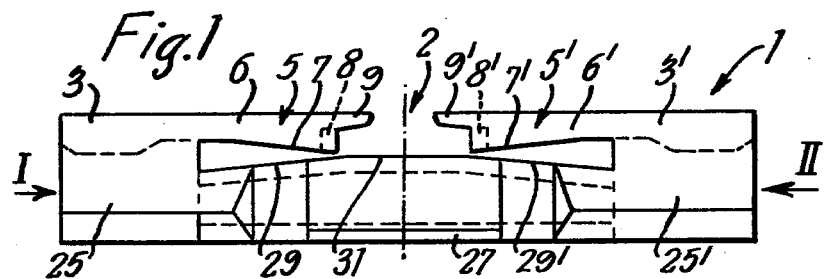
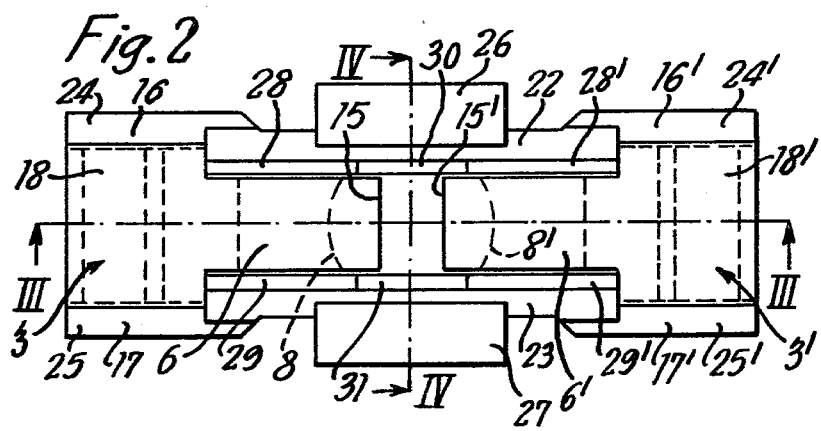
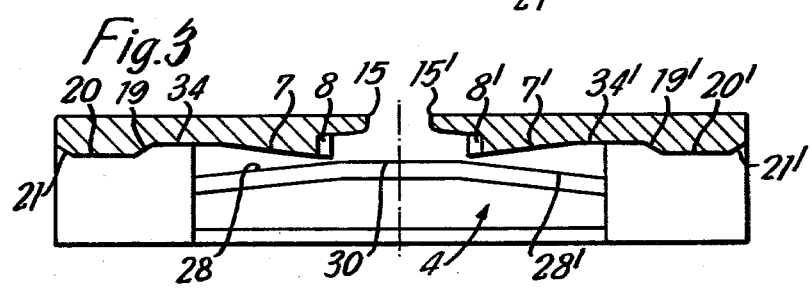
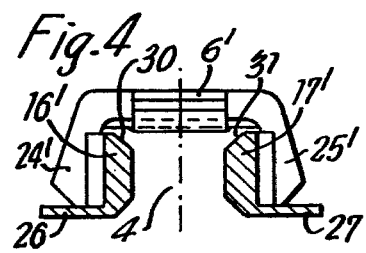
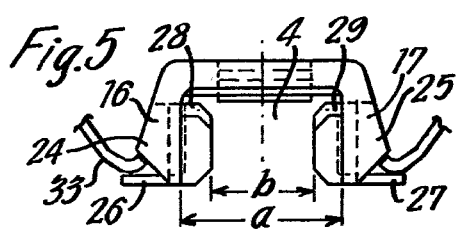

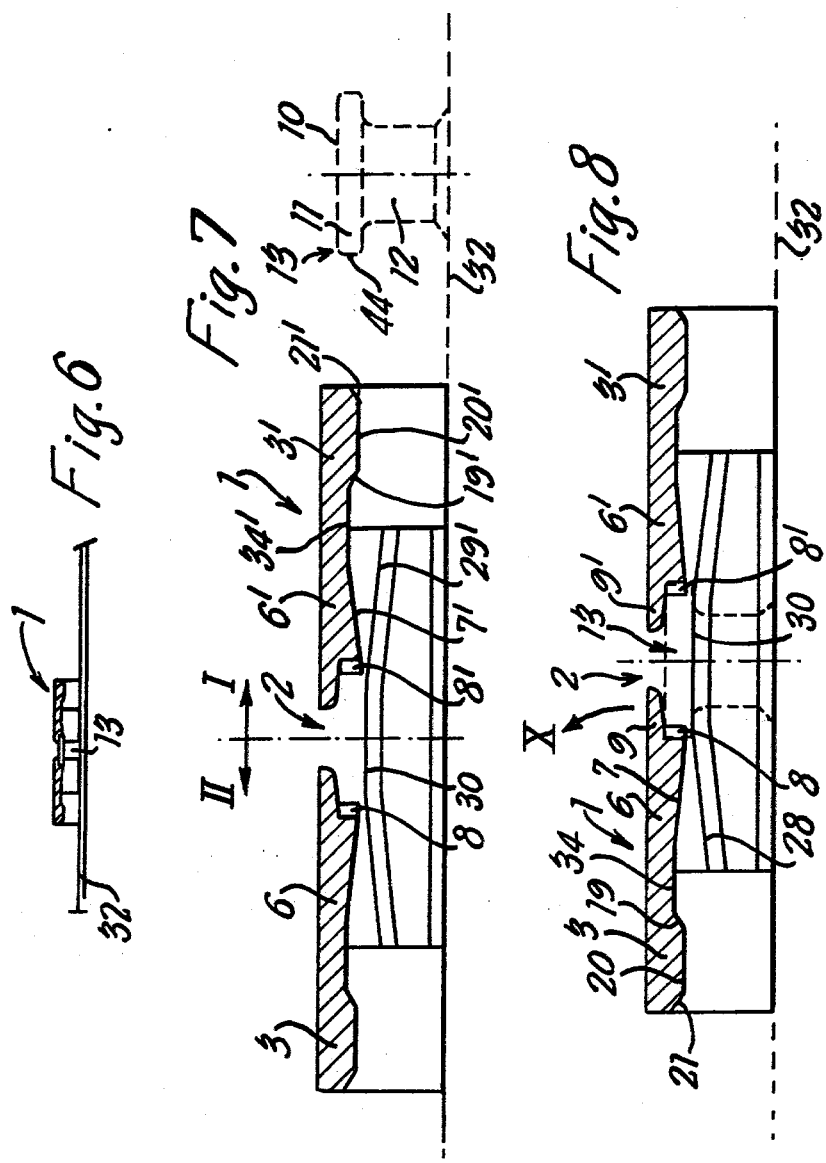

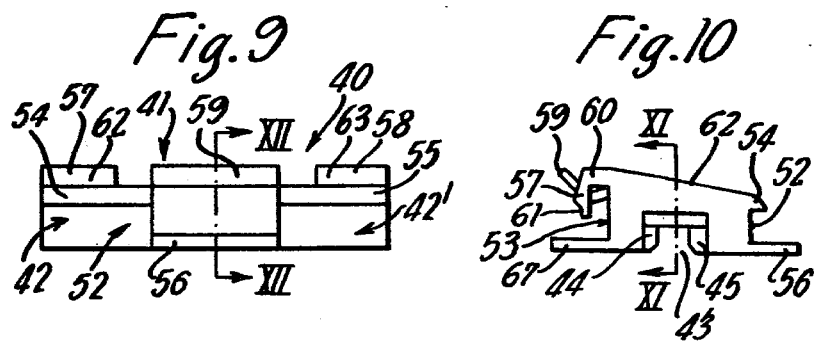
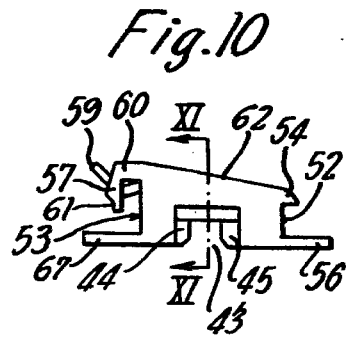
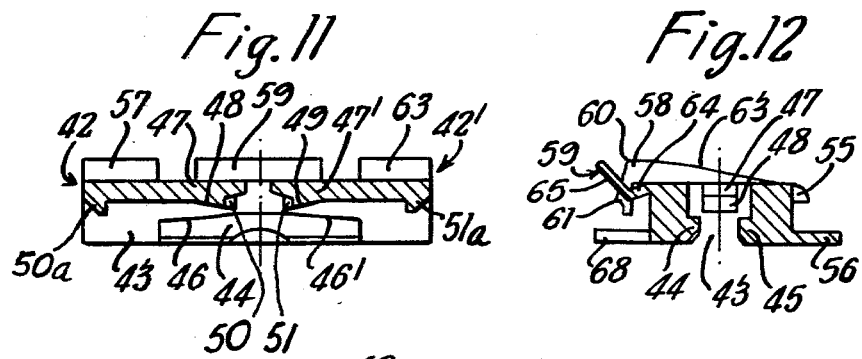
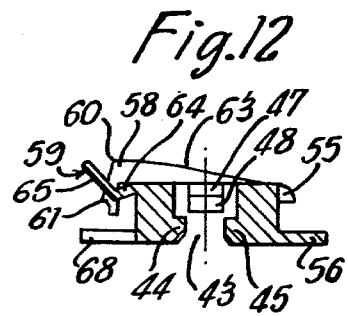
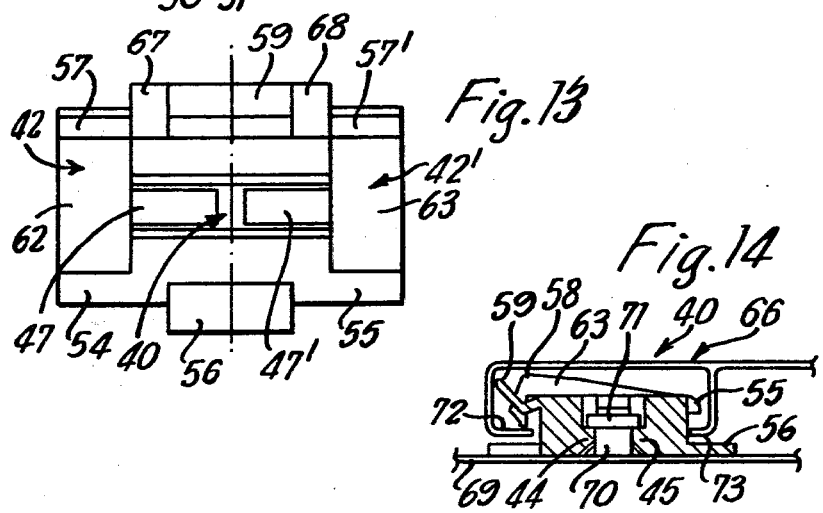
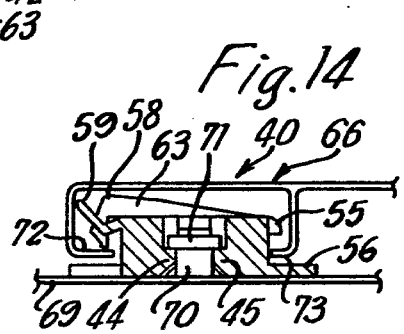

MOLDING RETAINER

BACKGROUND OF THE INVENTION

1. Field of the Invention

The present invention relates to a clip for fastening an article to a support provided with a projecting T-stud.

2. Description of the Prior Art

Retainer clips of the above type are already known. They are pushed, for example, onto a T-stud welded to the outer body of a motor vehicle, and are intended to attach trim strips to the outer surface of the vehicle body.

Many known retaining clips are designed with a keyhole-shaped opening. The T-stud is inserted into this opening and the retaining clip is then displaced laterally, moving the stud from an insertion area to a retaining area, where it is retained by spring-loaded tongues. In these known retaining clips, deformation and/or wear of the material of the clip is unavoidable during disassembly. For this reason, this known type of retaining clip cannot be reused. Furthermore, it is relatively difficult to install this type of retaining clip on the T-stud, and a certain amount of practice is required. By contrast, an object of the present invention consists in providing a retaining clip of the type described hereinabove, which is so designed that it is simple to install and can be removed without damaging the clip.

SUMMARY OF THE INVENTION

These objects are achieved by providing a clip for mounting an article on a support which has an upstanding headed stud, the clip comprising an open channel extending continuously through the clip from end to end whereby the clip can be slidably mounted on the stud from either end of the clip, the channel defining a retention area intermediate the length of the channel and two insertion areas and at least one resilient element having an abutment which is resiliently urged against the head of the stud when the clip is mounted on the stud with the head of the stud in the retention area, the abutment being adapted to resist withdrawal of the stud from the retention area.

This provides the advantage that the retaining clip can be installed from either side of the T-stud. Thus, the retaining clip need no longer be oriented visually in a single direction, as is required for the known retaining clips. The retaining clip can be removed by raising the resilient element without deforming the material and this allows the retaining clip to be reused at any time.

In one embodiment of the invention, a resilient element tensioned against the T-stud can be provided on either side of the retaining area. This allows disassembly in both directions without the retaining clip being deformed in the process so that it can be reused, as described above.

The resilient elements can each be a spring tongue extending from the insertion area to the retaining area and partially tensioning the circumference of the head of the T-stud. This ensures reliable retention of the retaining clip on the T-stud.

Each spring tongue is preferably provided with a sloping surface rising from the insertion area to the retaining area, each sloping surface facing the end of the T-stud. These sloping surfaces produce an increasing tension upon the retaining clip as the retaining clip is moved relative to the stud from the insertion area to the retaining area.

In the retaining area, the sloping surface terminates in a segment of a circle which tensions a portion of the circumference of the head of the stud, said circular segment being overlapped by a covering lip which partially overlaps the head of the stud. This ensures reliable retention of the retaining clip against the stud in the retaining area. The trailing edges of the lips of the two spring tongues have a space between them. This space makes it possible to remove the retaining clip from the stud if necessary by lifting one or the other of the spring tongues.

Each insertion area is preferably made U-shaped so that the spring tongue is disposed on the central or web part which connects the two side walls. The central part can be provided with a locking incline facing the sloping surface at a distance from the trailing end of the sloping surface of the spring tongue, said locking incline merging with a guide surface parallel to the upper side of the middle part, said guide surface being tapered at the beginning of the insertion area. This locking incline provides the advantage that the retaining clip cannot be suddenly removed from the stud.

The two U-shaped insertion areas may also be connected by ribs on the side walls. This has the advantage of providing a symmetrical design for the retaining clip.

Preferably the inner spacing of the side walls from one another corresponds to the diameter of the head of the stud and the inner spacing of the ribs from one another corresponds to the diameter of the stud shank. In the first place, this facilitates the insertion of the retaining clip onto the stud and thereafter reliable guidance is ensured as the retaining clip is slid further onto the stud by the ribs of the retaining clip which slide along the shank of the stud.

The inside transition is located between the legs and ribs in the area between the trailing sloping surface of the spring tongues and the retaining incline. The legs and ribs are provided with meshing surface in the insertion area located on the outside and at an angle to one another and with support flanges in the retaining area. By virtue of these meshing surfaces, for example, a trim strip can be mounted reliably on the outer body of a vehicle whereby a small space is left in the inserted state between the trim strip and the outer body owing to the support flange.

The ribs are provided on the inside with a conical opening, leading to a supporting surface in the retaining area whereby the supporting surface is located at a distance below the two covering surfaces. The distance between the supporting surfaces and the underside of the retaining clip is adjusted to the distance between the underside of the stud head and the support. This advantageously results in making the assembly process easier whereby the conical opening provided in each insertion area serves to increase the tolerance of the retaining clip relative to the stud. The maximum height after sliding onto the supporting surface is advantageously provided in the retaining clip so that with maximum tolerance for the space between the lower edge of the stud head and the car body, vibration of the retaining clip will be positively avoided.

In an alternative embodiment of the invention, at least one external shoulder is provided on one side of the clip and at least one external hook is provided on the other side of the clip, and a pressure element is provided as a contact part. This offers the advantage that a moulding or trim strip can then be installed, for example, from above in such manner that one side of the strip fits around the shoulder while the other side is guided through the pressure element and is surrounded by the hook when it is pushed into place. This ensures a reliable fastening of the strip to a support. The shoulders, the hooks, and the pressure element are designed so that rapid and functionally reliable installation is ensured without any special experience being necessary.

DESCRIPTION OF THE DRAWINGS

The invention will now be described in greater detail hereinbelow with reference to the embodiments shown in the drawings, in which:

FIG. 1 is a side view of a retaining clip according to the invention;

FIG. 2 is a top view of the retaining clip of FIG. 1;

FIG. 3 is a cross section along line III—III of FIG. 2;

FIG. 4 is a cross section along line IV—IV of FIG. 2;

FIG. 5 is a front view of the retaining clip of FIGS. 1 and 2;

FIG. 6 shows the retaining clip mounted on a T-stud in true scale;

FIG. 7 is the cross section of FIG. 3 with the retaining clip adjacent a T-stud shortly before assembly;

FIG. 8 shows the retaining clip installed on a T-stud in cross section;

FIG. 9 is a side view of a further embodiment of the invention;

FIG. 10 is a front view of the clip of FIG. 9;

FIG. 11 is a cross section along line XI—XI in FIG. 10, i.e., a central cross section through the clip;

FIG. 12 is a section along line XII—XII in FIG. 9;

FIG. 13 is a top view of the clip of FIG. 9; and

FIG. 14 shows the clip of FIG. 9 mounted on a T-stud and retaining a trim strip in position.

DESCRIPTION OF A PREFERRED EMBODIMENT

The retaining clip 1 shown in FIG. 1 has a retaining area 2 as well as insertion areas 3 and 3' located on either side thereof. The insertion areas 3 and 3' as well as the retaining area 2 form a continuous open channel 4 as shown particularly in FIGS. 4 and 5.

Each insertion area 3 and 3' is made U-shaped and is provided with the two opposed legs 16,17 and 16',17' and the middle parts 18,18' (FIG. 2). Each of middle parts 18,18' becomes a spring element 5,5'.

The spring elements 5,5' are designed as spring tongues 6,6' and each is provided in its lower part with a sloping surface 7,7' (FIGS. 1 and 3). These sloping surfaces 7,7' face retaining area 2. Sloping surfaces 7,7' gradually become segments of a circle at 8,8', each of said segments being covered by a covering area 9,9' of the corresponding spring tongue 6,6'. FIG. 2 clearly shows the two circular segments 8 and 8' in the form of segments of a circle. Covering surfaces 9 and 9' are separated by a space relative to their trailing edges 15 and 15' (FIG. 3).

As FIG. 3 shows, each sloping surface 7,7' becomes a flat surface 34,34'. Retaining inclines 19,19' contact these flat surfaces 34,34'. These retaining inclines 19,19' have the purpose of preventing sudden separation of retaining clip 1 from a T-stud. Retaining inclines 19,19' as shown in FIG. 3 become guide surfaces 20,20' which in turn merge into upwardly sloping surfaces 21,21'.

The two insertion areas 3 and 3', shown in FIG. 2, are connected together by ribs 22 and 23. Rib 22 abuts one leg 16 of insertion area 3 and the other leg 16' of insertion area 3'. Accordingly, the other rib 23 abuts leg 17 of insertion area 3 and leg 17' of insertion area 3'.

It is clear from FIGS. 4 and 5 that legs 16,17 and 16',17' of the U-shaped insertion areas 3,3' are provided on the outside with meshing surfaces 24,25 and 24',25'. Meshing surfaces 24, 25, 24', and 25' are at angles to one another and serve to hold an appropriately designed trim strip shown in part at 33 on a motor vehicle. However, it is also possible, for example, to make the meshing surfaces with a different shape in order to mount other elements on a support by means of a T-stud and the retaining clip according to the invention.

In the present case, support flanges 26 and 27 are provided in retaining area 2 as shown in FIGS. 2, 4, and 5. The trim strips held by meshing surfaces 24, 25, 24', and 25' rest on these support flanges. It is apparent from FIGS. 1, 2, and 3 that ribs 22 and 23 are each provided with conical openings 28,28' and 29,29' on the inside in the retaining area. These conical openings lead to support surfaces 30 and 31 (FIG. 2). The sloping parts of conical openings 28,28', 29, 29' are at an angle to sloping surfaces 7,7' of spring tongues 6,6'.

It is evident from FIG. 2, FIG. 4, and FIG. 5 that in each insertion area 3 the space between the opposed legs 16,17 and 16',17' corresponds to the diameter of the head of the T-stud. In the vicinity of ribs 22 and 23, this space (a) tapers (as shown in FIG. 5) to space (b). Space (b) roughly corresponds to the diameter of the shaft of the T-stud. This ensures that the inserted retaining clip is guided reliably.

FIGS. 6 and 8 show the retaining clip mounted on a T-stud in greater detail. Assembly is accomplished as follows:

Since one insertion area 3 and 3' is provided on either side of retaining area 2, and all three of the above areas form a continuous channel 4, it is possible, according to FIG. 1, to push the retaining clip onto a T-stud either in the direction of arrow I or in the direction of arrow II.

FIG. 7 shows in greater detail how the retaining clip according to the invention is pushed in the direction of arrow I onto a T-stud 13. This T-stud 13 is welded to a support 32 and consists of a shaft 12 and a head 11, said head having an end 10. When the retaining clip according to the invention is pushed in the direction of arrow I onto the T-stud, the taper 21 initially facilitates the insertion of the retaining clip. Retaining clip 1 is further guided by guide surface 20, located parallel to the end 10 of the T-stud, and the retaining clip finally reaches the area between the flat surfaces 34', delimited on one side by retaining incline 19' and on the other side by sloping surface 7'.

While space (a) existed between the two legs of the U-shaped insertion area 3' in insertion area 3' according to FIG. 5 in the process described hereinabove, as it is advanced further, the retaining clip enters an area where distance (b) exists; in other words, the insides of ribs 22 and 23 abut the outer circumference of shaft 12. As the retaining clip is inserted further, the end 10 slides along the sloping surface 7' of spring tongue 6' and displaces the latter upwardly. The T-stud is further guided by the fact that the lower edge of head 11 is guided on conical opening 19'. When the T-stud has been inserted completely as shown in FIG. 8 and is in retaining area 2, the spring tongue 6' snaps back into its original position shown in FIG. 8. Stud 13 is now reliably retained in retaining area 2; two circular segments 8 and 8' tension the circumference 14 of the head of the T-stud 13, whereby the two covering surfaces 9 and 9' partially overlap head 11.

T-stud 13 is thus reliably mounted in retaining area 2 of retaining clip 1 as shown in FIG. 8. The underside 33 of head 11 of T-stud 13 is supported by support surfaces 30 and 31. The distance between support surfaces 30 and 31 and support 32 is dimensioned so that, with a maximum tolerance for the space between the lower edge of the head and the support, vibration of retaining clip 1 is positively avoided. After T-stud 13 reaches retaining area 2, retaining clip 1 is thus reliably mounted on support 32. It is also possible, for example, to push a trim strip over the retaining clip in such fashion that the legs of the trim strip overlap the meshing surfaces 24,25 and 24',25' and also rest on support flanges 26 and 27 (FIG. 4, FIG. 5). Thus, for example, a trim strip can be mounted in a functionally reliable fashion by simple means on a support, for example, the outer body of a motor vehicle.

If retaining clip 1 is now to be removed from the T-stud, it is possible, for example, as shown in FIG. 8 to raise spring tongue 9 in the direction shown by arrow X gripping and lifting trailing edge 15, for example, with a tool or with a finger. When circular segment 8 of spring tongue 6 leaves the meshing area of head 11 of stud 13, retaining clip 1 can be displaced in the direction of arrow I whereby the end 10 of head 11 of T-stud 13 slides along the sloping surface 7 of spring tongue 6, until head 11 eventually reaches the area of flat surface 34. At this point, it cannot be slid smoothly any further since the end 10 of head 11 of T-stud 13 rests against retaining incline 19. This prevents sudden separation of retaining clip 1 from T-stud 13. Incline 19 can be made at 90°, so that retaining clip 1 must be lifted off.

As retaining clip 1 is displaced relative to T-stud 13 away from retaining area 2 to the area of flat surface 34 and retaining surface 19, retaining clip 1 is also guided by conical opening 28 and by space (b) between ribs 22 and 23 in the area of its head 11 and shaft 12.

When the retaining clip is located, as described above, relative to T-stud 13 in the vicinity of flat surface 34, it is possible by lifting insertion area 3 slightly, to raise the retaining incline 19 above head 11 of T-stud 13 so that the retaining clip can be removed via guide surface 20 and incline 21 from T-stud 13. This completes the removal of retaining clip 1 from T-stud 13 without deforming the retaining clip 1. Retaining clip 1 can then be reused.

According to FIGS. 1 and 7, it is also possible to slide retaining clip 1 in the direction of arrow II, for example, onto a T-stud. The processes described above are then repeated.

The retaining clip 1 makes it possible by virtue of its design to slide it onto a T-stud 13 via insertion areas 3,3' from either side. During the insertion process, the retaining clip is reliably guided by the various sloping surfaces, so that in each case a situation is ensured in which retaining clip 1 continues to be advanced until the T-stud 13 meshes with retaining area 2. In this retaining area 2, T-stud 13 is reliably engaged whereby removal of the retaining clip is virtually impossible without raising one of the spring-loaded tongues 6,6'. However, if disassembly is carried out in the manner described hereinabove, no damage to retaining clip 1 will result.

Finally, therefore, a retaining clip is provided which is easy to install and to remove without requiring any special prior knowledge and without the retaining clip being damaged.

DESCRIPTION OF A MODIFIED EMBODIMENT

It will be appreciated that the clip 1 may be designed to engage different shapes and sizes of trim strip or body mouldings. One such advantageous design is shown in FIGS. 9 to 14 in which a retaining clip according to the present invention is indicated generally at 40.

The clip 40 shown in FIGS. 9 to 14 is provided with a retaining area 41 as well as insertion areas 42 and 42' located to either side of area 41. Insertion areas 42 and 42' as well as retention area 41 form a continuous open channel 43 as shown in greater detail in FIGS. 10, 11 and 12.

Each insertion area 42 and 42' is U-shaped and is provided with legs 44 and 45 opposite one another. These legs 44 and 45 are provided with stop faces 46 and 46' in the insertion slide-on areas 42 and 42'.

Each insertion area 42 and 42' is provided with a spring tongue 47 and 47', said tongue projecting into the retention area 41 as shown in FIG. 13. Each spring tongue 47 and 47' is provided with a sloping surface 48 and 49 which extends toward retention area 41 from each insertion area 42 and 42'. The retention area is provided with locking elements 50 and 51, said elements having the function of preventing inadvertent sliding out of the stud from the clip. If it were to slide out, the stud head would contact the corresponding locking element 50a or 51a and thus encounter a resistance.

The clip 40 is provided with two lengthwise sides 52 and 53. Two shoulders 54 and 55 are provided on lengthwise side 52. Furthermore, lengthwise side 52 is provided in the lower area with a support flange 56.

Lengthwise side 53 is provided with two hooks 57 and 58 between which a pressure element 59 is disposed. Each hook 57 or 58 consists of a short horizontal leg 60 and a longer vertical leg 61. This longer leg 61, as shown in FIG. 10, is provided on the outside with one increasing and one decreasing area which makes a transition to a stop area parallel to the inside. The two shoulders 54 and 55 of lengthwise side 52 are connected with two hooks 57 and 58 of lengthwise side 53 by a sloping inclined plane 62 and 63 as shown in FIGS. 10, 12 and 13.

Pressure element 59 is located at the height of the two shoulders 54 and 55 and includes a short sloping leg 64 as well as a longer projecting leg 65. The longer projecting leg 65 extends to the level of the top surface of the short horizontal leg 60 of one of hooks 54 or 55 and is inclined relative to the abutting lengthwise side 53 of the clip. This horizontal leg 65 thus performs a guide function when a trim strip 66 is installed in position.

It follows from FIGS. 10 and 13 that lengthwise side 53 of fastening element 40 is provided in the lower region with a support flange 67 or 68 between the two hooks 57 and 58. The two support flanges 67 and 68 as shown in the FIG. 13 top view enclosure pressure element 59.

FIG. 14 shows a support 69 on which a T-stud 70 is mounted. Installation of the clip 40 is carried out in such a manner that the clip is pushed, for example, over insertion area 42 through open channel 43 and over stud 70 whereby legs 44 and 45 of the fastening element guide the shank of the stud 70. The support surface 46' guides the underside of head 71 of the stud whereby sloping surface 48 of spring tongue 47 acts upon the upper surface of head 71 of the stud. Consequently the clip is reliably guided onto the stud. Installation is complete when the head 71 of the stud 70 comes to rest in retention area 41 as shown in FIG. 14. The trim strip 66 can be mounted on the clip 40 by sliding the strip on from one or the other side of the clip so that the two shoulders 54 and 55 and the two hooks 57 and 58 hold the trim strip in place or alternatively by locating one flange 72 of the strip over the pressure element 59 and then pressing the other flange 73 of the clip downwardly until it snaps over the shoulders 54 and 55.

I claim:

1. A clip for mounting an article on a support which has an upstanding headed stud, the clip comprising an open channel extending continuously through the clip from end to end whereby the clip can be slidably mounted on the stud from either end of the clip, the channel defining a retention area intermediate the length of the channel and two insertion areas, at least one resilient element having an abutment which is resiliently urged against the head of the stud when the clip is mounted on the stud and the head of the stud is in the retention area, the abutment being adapted to resist withdrawal of the stud from the retention area, the channel being generally of inverted U-shape in cross-section and being defined by side walls and a web formed at least partly by the resilient element, and connecting ribs which define the side walls proximate the retaining area and extend from one insertion area to the other.

2. A clip as claimed in claim 1, wherein the resilient element comprises a tongue which extends in the direction of the length of the channel from an insertion area towards the retention area and terminates in the retention area.

3. A clip as claimed in claim 1, wherein the undersurface of the resilient element has a sloping surface facing away from the retention area.

4. A clip as claimed in claim 3, wherein the web of the channel is formed with a retaining incline on the resilient element which faces the sloping surface and with a guide surface adjacent the retaining incline, the guide surface being generally parallel with the direction of the length of the channel.

5. A clip as claimed in claim 3, wherein the ribs extend from the or each insertion area in the region of the sloping surface of the resilient elements.

6. A clip as claimed in claim 5, wherein the side walls of the clip are provided with external angled surfaces in the insertion areas and with external flanges in the retention area.

7. A clip as claimed in claim 1, wherein two resilient elements are provided, one at each end of the retention area.

8. A clip as claimed in claim 7, wherein the sloping surface of each resilient element terminates in the retention area in an arcuate end surface adapted to abut the head of the stud and a lip projecting beyond the end surface which is adapted to overlie the head of the stud when the head of the stud abuts the arcuate end surface of the resilient element.

9. A clip as claimed in claim 8, wherein the facing end edges of the lips of the two resilient elements are spaced apart.

10. A clip as claimed in claim 7, wherein the connecting ribs are spaced apart by a distance approximately equal to the diameter of the shank of the stud to be engaged and the side walls of the channel are spaced apart by a distance approximately equal to the diameter of the head of the stud.

11. A clip as claimed in claim 8, wherein the ribs form conical openings leading to support surfaces which are positioned beneath and spaced from the lips of the resilient elements.

12. A clip as claimed in claim 1, wherein at least one external shoulder is provided on one side of the clip and at least one external hook and at least one external pressure element are provided on the other side of the clip.

13. A clip as claimed in claim 12, wherein a support flange is provided on the lengthwise side of the clip which is provided with the two shoulders and two support flanges are disposed on the lengthwise side of the clip which is provided with the two hooks and the pressure element therebetween.

14. A clip as claimed in claim 13, wherein one support flange as seen in top view is located between the two shoulders and the two support flanges enclosing the pressure element between the two hooks.

15. A clip as claimed in claim 12, wherein two external shoulders are provided on one side of the clip and two external hooks and an external pressure element therebetween are disposed on the other side of the clip.

16. A clip as claimed in claim 15, wherein the pressure element is at the height of the two shoulders and consists of a short sloping leg and a longer projecting leg.

17. A clip as claimed in claim 15, wherein the two external shoulders and the two external hooks are each connected to one another by a sloping inclined planar surface on the upper surface of the clip.

18. A clip as claimed in claim 17, wherein each hook has a short horizontal leg and a longer, vertical leg, said longer vertical leg being located at a distance from one lengthwise side of the clip.

19. A clip as claimed in claim 18, wherein the longer leg is provided on the outside with one increasing and one decreasing area, said decreasing area effecting a transition to a stop area parallel to the inside.

20. A clip as claimed in claim 18, wherein the longer projecting leg of the pressure element extends up to the height of the upper surface of the short horizontal leg of the or each hook.

21. A clip as claimed in claim 20, wherein the longer projecting leg of the pressure element is inclined relative to the abutting lengthwise side of the clip.

22. A clip for mounting an article on a support which has an upstanding headed stud, the clip being of generally inverted U-shape in cross-section and having side walls joined at their upper ends by middle parts extending therebetween, the clip defining an open channel extending longitudinally and continuously through the clip from end to end whereby the clip can be slidably mounted on the stud from either end of the clip, the channel defining a retention area intermediate the length of the channel and two insertion areas located proximate the middle parts, and the clip including at least one resilient element having an abutment which is resiliently urged against the head of the stud when the clip is mounted on the stud and the head of the stud is located in the retention area to resist withdrawal of the stud from the retention area, the resilient element extending lengthwise of the clip and being a longitudinal, substantially coplanar extension of said middle part.

23. A clip as claimed in claim 22, wherein the resilient element comprises a tongue which extends in the direction of the length of the channel from an insertion area towards the retention area and terminates in the retention area.

24. A clip as claimed in claim 22, wherein the undersurface of the resilient element has a sloping surface facing away from the retention area.

25. A clip as claimed in claim 22, wherein two resilient elements are provided, one at each end of the retention area.

26. A clip as claimed in claim 25, wherein the sloping surface of each resilient element terminates in the retention area in an arcuate end surface adapted to abut the head of the stud and a lip projecting beyond the end surface which is adapted to overlie the head of the stud when the head of the stud abuts the arcuate end surface of the resilient element.

27. A clip as claimed in claim 26, wherein the ribs form conical openings leading to support surfaces which are positioned beneath and spaced from the lips of the resilient elements.

28. A clip as claimed in claim 26, wherein the facing end edges of the lips of the two resilient elements are spaced apart.

29. A clip as claimed in claim 24, wherein the insertion areas of the clip are joined by connecting ribs which define the side walls in the retaining area of the clip.

30. A clip as claimed in claim 29, wherein the connecting ribs are spaced apart by a distance approximately equal to the diameter of the shank of the stud to be engaged and the side walls of the channel are spaced apart by a distance approximately equal to the diameter of the head of the stud.

31. A clip as claimed in claim 29, wherein the ribs extend from the or each insertion area in the region of the sloping surface of the resilient elements.

32. A clip as claimed in claim 31, wherein the side walls of the clip are provided with external angled surfaces in the insertion areas and with external flanges in the retention area.

33. A clip as claimed in claim 22, wherein at least one external shoulder is provided on one side of the clip and at least one external hook and at least one external pressure element are provided on the other side of the clip.

34. A clip as claimed in claim 33, wherein a support flange in provided on the lengthwise side of the clip which is provided with the two shoulders and two support flanges are disposed on the lengthwise side of the clip which is provided with the two hooks and the pressure element therebetween.

35. A clip as claimed in claim 34, wherein one support flange as seen in top view is located between the two shoulders and the two support flanges enclosing the pressure element between the two hooks.

36. A clip as claimed in claim 33, wherein two external shoulders are provided on one side of the clip and two external hooks and an external pressure element therebetween are disposed on the other side of the clip.

37. A clip as claimed in claim 36, wherein the pressure element is at the height of the two shoulders and consists of a short sloping leg and a longer projecting leg.

38. A clip as claimed in claim 36, wherein the two external shoulders and the two external hooks are each connected to one another by a sloping inclined planar surface on the upper surface of the clip.

39. A clip as claimed in claim 38, wherein each hook has a short horizontal leg and a longer, vertical leg, said longer vertical leg being located at a distnace from one lengthwise side of the clip.

40. A clip as claimed in claim 39, wherein the longer leg is provided on the outside with one increasing and one decreasing area, said decreasing area effecting a transition to a stop area parallel to the inside.

41. A clip as claimed in claim 39, wherein the longer projecting leg of the pressure element extends up to the height of the upper surface of the short horizontal leg of the or each hook.

42. A clip as claimed in claim 41, wherein the longer projecting leg of the pressure element is inclined relative to the abutting lengthwise side of the clip.

* * * * *